May 14, 1940.  A. PRIMAS  2,200,399
HINGE FOR BOXES AND THE LIKE
Filed Oct. 6, 1938  3 Sheets-Sheet 1
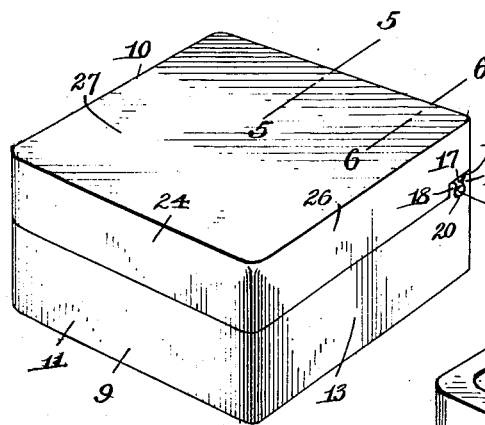
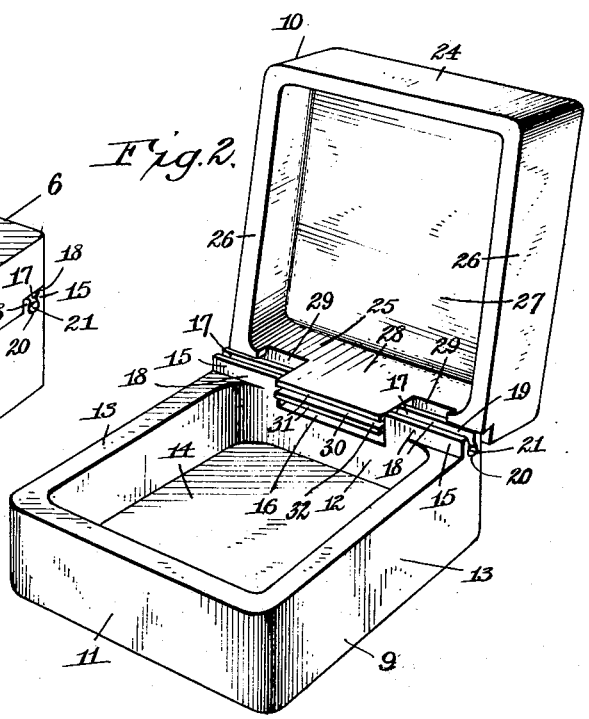
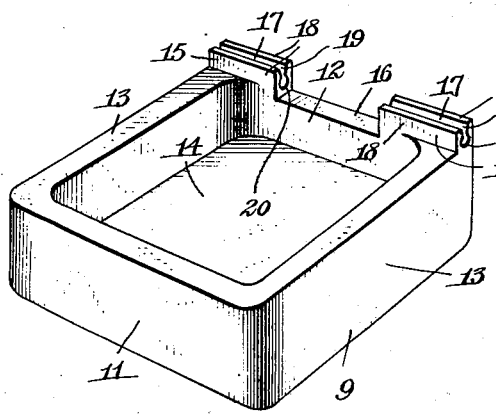
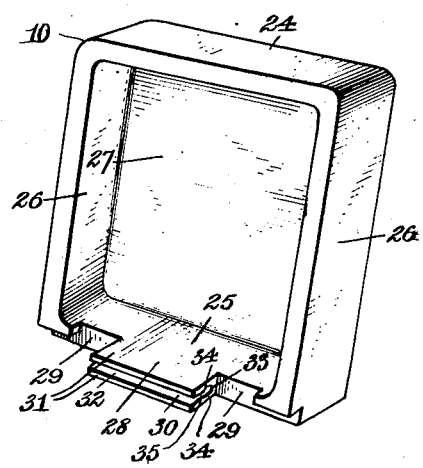
Alexander Primas,
Inventor
By Emil Kuchart
Attorney

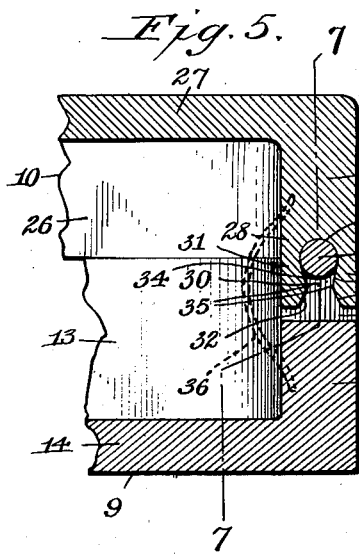
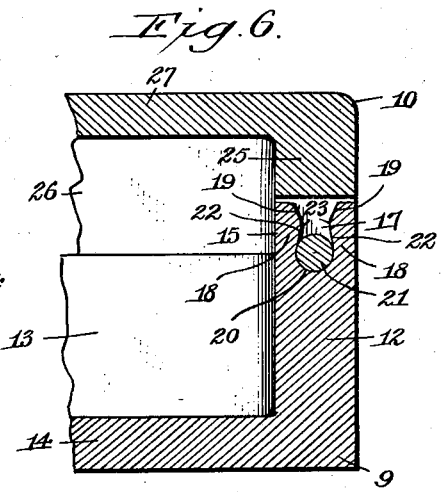
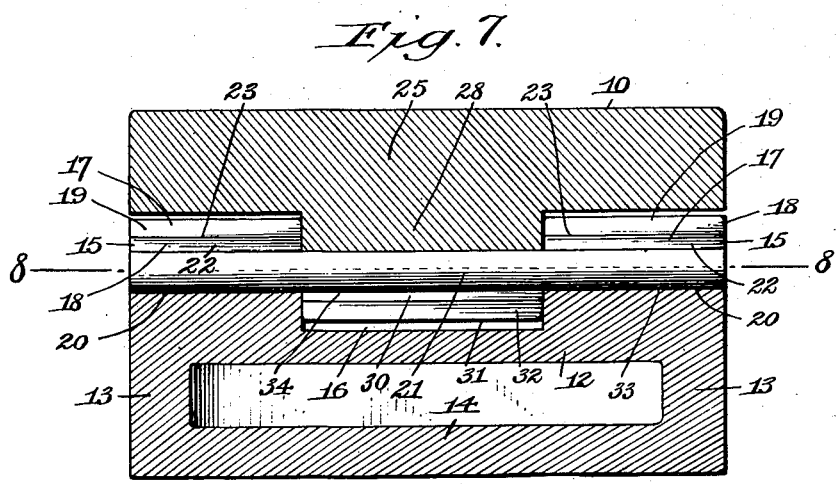
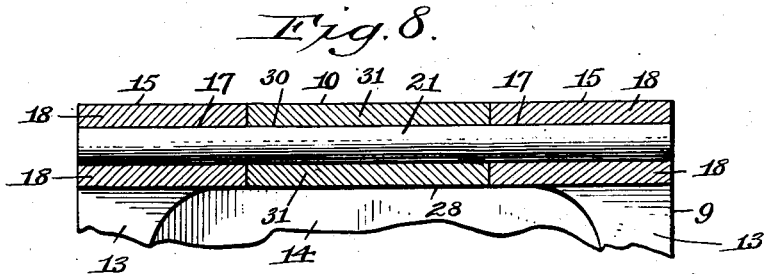

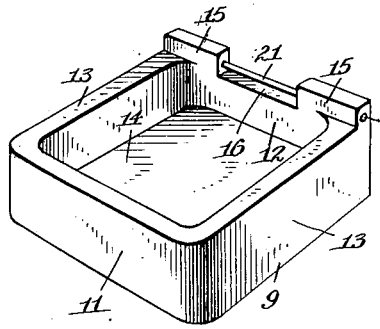
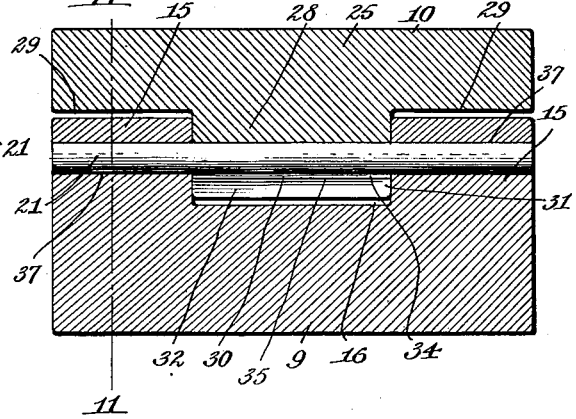
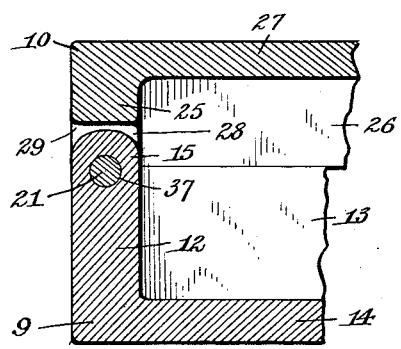
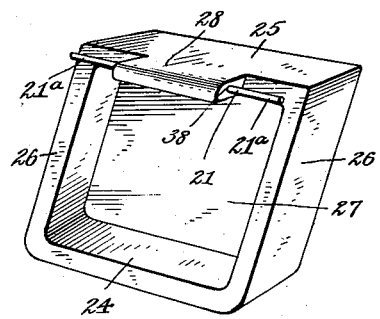
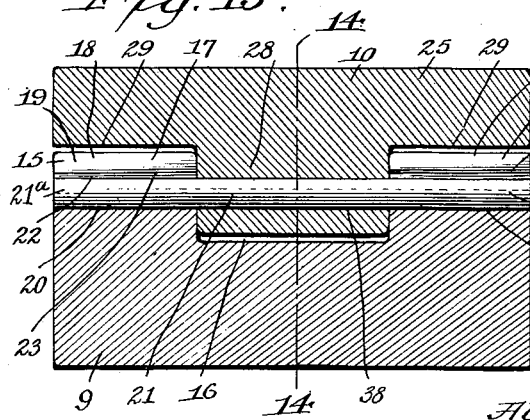
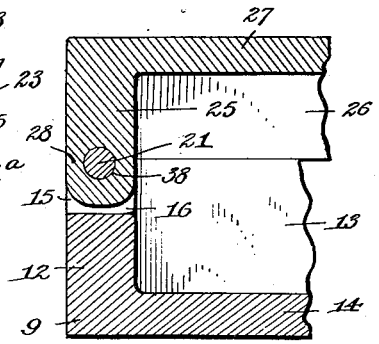

Patented May 14, 1940

2,200,399

UNITED STATES PATENT OFFICE 2,200,399

HINGE FOR BOXES AND THE LIKE

Alexander Primas, Buffalo, N. Y.

Application October 6, 1938, Serial No. 233,590

7 Claims. (Cl. 16—171)

My invention relates to improvements in hinge-constructions for boxes, and more particularly jewelry boxes.

The primary object of my invention is to provide a simple, inexpensive hinge connection between box parts, such as the body portion and cover, whereby the simple application of the hinge member within one part of the box and the mere positioning of the other part of the box relative to the first will connect the two parts together and maintain a hinge connection between them.

Another object of my invention is to provide the two parts of a box with pin-retaining grooves at the hinged region of said box, so disposed that a hinge element or pin placed in the grooves of one of said box parts will enable said hinge element or pin to enter the groove of the other box part by the mere positioning of said last-mentioned box part relative to the other.

A further object is to provide the body and cover portions of a molded box with interfitted flanges having pin-receiving grooves formed therein provided with pin-seats oppositely disposed and whose axes are co-incident, said pin-receiving grooves opening to the outer edges of said flanges and the walls of said grooves being slightly yielding so that upon placing the hinge-pin in one of said parts the mere pressing of the parts together to interfit said flanges will result in hingedly connecting the two parts of the box together.

The invention therefore consists in the novel features of construction and in the arrangement and combination of parts to be hereinafter described and more particularly pointed out in the subjoined claims.

In the drawings,

Fig. 1 is a perspective view of a jewelry box having two parts thereof hingedly connected together by means of my improved hinge structure.

Fig. 2 is a perspective view of the box showing the same open to illustrate the structural parts of the hinge connection.

Fig. 3 is a perspective view of the body-portion of the box detached from the cover.

Fig. 4 is a perspective view of the cover detached from the body-portion of the box.

Fig. 5 is an enlarged section taken on line 5—5, Fig. 1.

Fig. 6 is an enlarged section taken on line 6—6, Fig. 1.

Fig. 7 is a section taken on line 7—7, Fig. 5.

Fig. 8 is a section taken on line 8—8, Fig. 7.

Fig. 9 is a perspective view of the body portion of a box detached from the cover showing a modified form of my invention.

Fig. 10 is a section similar to Fig. 7 showing my improved hinge construction in the modified form shown in Fig. 9.

Fig. 11 is a section taken on line 11—11, Fig. 10.

Fig. 12 is a perspective view of the cover of a box detached from the body portion thereof showing another modification of my invention.

Fig. 13 is a section similar to Figs. 7 and 10, showing the modified form of my invention illustrated in Fig. 12.

Fig. 14 is a section taken on line 14—14, Fig. 13.

The reference numeral 9 designates the body-portion of the box and 10 the cover. Preferably my invention is embodied in molded boxes, such as formed of Bakelite and other condensed products of phenols, or of plastic materials of various kinds possessing good qualities of resistance against strains, but it is to be understood that it may be constructed of various other kinds of materials.

The body-portion of the box shown has an outer end wall 11, an inner or hinge-end wall 12, side walls 13, and a bottom 14. The inner or hinge-end wall 12 extends above the upper edges of the front and side walls 11 and 13, respectively, and the portions extending upwardly may be referred to as upstanding flanges, which I designate by the numeral 15. These flanges are separated by a cut-away portion 16 formed in the rear or hinge-end wall 12. Although I refer to a "cut-away portion", this term is employed figuratively, especially when the box is molded to form, in which case the cut-away portion 16 may be more properly termed a space or depression.

The flanges 15 are provided with pin-receiving grooves 17, the side walls 18 of which have their inner surfaces beveled inwardly slightly from their upper edges, as at 19, and the lower ends of these grooves are rounded or made semi-circular, as at 20, to serve as seats for a hinge-pin 21. The lower portions of these opposite side walls converge from the semi-circular pin seats, as at 22, and merge into the beveled upper portions of said walls, as at 23, thus creating a horizontal line at their juncture to establish a slightly restricted space at said lines slightly less in dimension than the diameter of the hinge-pin 21.

By making the box of Bakelite or similar material, the walls 18, spaced apart by the grooves 17, possess a slight inherent resiliency and are, therefore, slightly yielding so that by introducing the hinge-pin into the grooves and forcing the same downwardly against the seats 20, the opposite walls of each groove will be forced apart slightly to permit the passing of the hinge-pin beyond the restricted portions of the grooves, thus providing assurance that after seating the hinge-pin against its seats, it will be so maintained unless forcibly retracted, or driven out of the grooves lengthwise.

The cover 10 has an outer end wall 24, an inner or hinge-end wall 25, side walls 26, and a top wall 27. The inner or hinge-end wall 25 has extending from its edge a depending flange 28 which is centrally disposed thereon and of a length to fit into the space or depression 16 formed in the inner or hinge-end wall of the box-portion. At opposite sides of this depending portion the hinge-end wall is recessed, as at 29, to a depth conforming to that of the projection of the flanges 15 on the inner or hinge-end wall of the body-portion so that when the cover is closed upon the body portion, said recesses 29 will receive the flanges 15 of the body-portion and the depression 16 in the inner or hinge-end wall of the latter the depending flange 28.

The depending flange 28 is also provided with a pin-receiving groove 30 extending upwardly or inwardly from its lower or outer edge, and the side walls 31 of this groove have their inner surfaces beveled slightly from the edge of the flange, as at 32. The upper or inner end of this groove is rounded or made semi-circular, as at 33, to serve as a seat for the hinge-pin 21. The upper or inner portions of these opposite side walls converge from the semi-circular pin-seat 33, as at 34, to merge into the beveled outer or lower portions of said walls, as at 35, thus also creating a horizontal line at their juncture similar to those in the grooves 17 formed in the body-portion of the box. Whether the cover is closed or is in any other position with reference to the body-portion of the box, the axes of the semi-circular pin-seats 20 and 33 are co-incident.

Assuming therefore that the hinge-pin has been entered in the pin-receiving grooves 17 in the manner above stated, it is only necessary in order to hingedly connect the cover of the box to the body-portion thereof to position the cover over the body-portion, with the groove 30 of the depending flange 28 alined with that portion of the pin exposed between the two upstanding flanges 15, and then bear down upon the cover to force the depending flange 28 over the pin, during which action the side walls 31 of said depending flange yield sufficiently to force the pin beyond the restricted portion of the groove 30.

While this manner of connecting the two box parts together is the simplest and most efficient, it will be apparent that these parts may be connected by positioning the depending flange 28 between the upstanding flanges 15 and then insert the hinge-pin by movement endwise from one side of the box so as to first pass through the nearest upstanding flange 18, thence through the depending flange 28, and finally enter the groove of the distant upstanding flange. This connection can be made from either side of the box.

Usually jewelry boxes of the type shown are lined, and in some instances padded and shaped to receive the particular article of jewelry intended for the same. This, however, does not enter into my invention, since the lining or padding may be effected in the usual way, and if desired the entire hinge structure may be covered or concealed by any of the well-known means now in common use.

Some forms of boxes are provided with catches to maintain the cover in closed position. Others have both catches and springs, so that when the catches are released the cover will automatically swing into open position. A catch of any type may be employed in connection with a box constructed in accordance with this invention, and a spring of any of the various kinds now employed may also be used. As an example of one type of spring that may be employed I have illustrated with dotted lines in Fig. 5 a semi-elliptical spring 36, one end of which is secured to the inner or hinge-wall of the cover and the other to the inner or hinge-wall of the body-portion of the box. As this forms no portion of my invention, it will be understood that my improved hinge-structure may be used wherever box portions are hinged together.

It will furthermore be apparent that if for any reason the cover is to be removed from the body-portion of the box, the exertion of force upwardly on the cover, or downwardly on the body-portion of the box, will cause the pin to ride out of the pin-retaining groove or grooves of one box part, during which action the walls of the respective groove or grooves subjected to strain will yield laterally and permit the hinge-pin to move beyond the restricted portion or portions of the groove or grooves, and thus permit separation of the two box parts.

In the drawings I have shown the pin-receiving grooves 17 extending the full length of the flanges 15 so that they open at opposite ends of said flanges. These grooves, however, may extend outwardly along said flanges from the inner ends thereof any desired distance, in which case the hinge pin could not be positioned within the flanges 15 by movement endwise from one or the other side of the box, yet all the advantages of the construction illustrated in Fig. 3 of the drawings would be retained. It is also the province of my invention to permit the positioning of the hinge pin in one box part in any desired manner, so long as a portion thereof is exposed to enable the grooved flange of the other box part to be thrust thereover by movement in a direction at right angles to the axis of the hinge pin. To better illustrate this I have shown the upstanding flanges 15 in Figs. 9, 10 and 11 formed without the pin-receiving grooves 17 illustrated in the previous figures; the modification shown in said figures having the hinge pin 21 thrust through pin openings 37 formed axially coincident in said flanges 15, the pin being exposed in the space or depression 16 formed in the rear wall of the box portion between the flanges 15 and being entirely surrounded by space. In this modification the cover 10, shown in the preceding figures, is employed, the depending flange 28 of said cover being thrust into the space or depression 16 and the opposite side walls 31 being adapted to be forced over the exposed portion of said pin in the same manner as employed in applying the cover to the body portion in the preceding figures, assuming that the hinge pin in the latter instance has been previously lodged in the pin-receiving grooves 17 of the flanges 15 in said figures.

In the modification shown in Fig. 12 the groove 30 shown in the depending flange of the preceding figures is omitted, said flange being made solid and having a hinge pin opening 38 formed therethrough in which is fastened the hinge pin 21 so that it projects from opposite ends of said flange and terminates with the opposite sides of the cover. In this instance the hinge pin is exposed at opposite ends, as at 21ª, and the cover thus constructed is to be used in connection with the body portion of the box shown in Fig. 3 wherein the upstanding flanges 15 are provided with pin-receiving grooves 17. In order to apply the cover shown in this second modification to the body portion of the box shown in Fig. 3, it is only necessary to position the cover with respect to the box so that the projecting ends 21ª of the pins will enter the pin-receiving grooves 17 of the body portion by merely thrusting the cover downwardly against the body portion with sufficient pressure to force the pin to the inner ends of the pin-receiving grooves, the said walls of the groove yielding under the pressure exerted and automatically retaining the pin against the seats 20 formed in the flanges 15.

Having thus described my invention, what I claim is:

1. A hinge for a box comprising two parts, each of which has a hinge-pin retaining groove opening toward the other part of the hinge and a hinge-pin fitted in the inner ends of said grooves, the walls of said grooves being slightly yielding and formed to receive the hinge-pin under pressure exerted in the direction of the depth of said grooves and to retain said hinge-pin within said grooves under the inherent resiliency of said walls.

2. A hinge for a box formed of molded material slightly resilient and comprising two parts, each of which has a wall provided with a hinge-pin retaining groove opening to the edge of said wall and a hinge-pin located in said grooves, the inner ends of said grooves serving as seats for said hinge-pin and the axes of said seats being co-incident, said walls being provided with means to retain said hinge-pin at the inner ends of said grooves while permitting separation of said two parts under force applied in a direction at right angles to the axis of said hinge-pin.

3. A hinge for a box comprising two parts formed of slightly resilient molded material, one of said parts being provided with upstanding spaced-apart flanges and the other with a depending flange fitted between said upstanding flanges, each of said flanges having pin-receiving grooves opening at the edge of the flange, the inner ends of said grooves being rounded to form pin-seats and having coinciding centers, and a pin entered in said grooves against said pin-seats, the walls of said grooves extending outwardly from said rounded pin-seats and being formed to provide a restricted portion for each of said grooves beyond which said hinge-pin can pass only upon exertion of force applied either to said pin or said box parts in a direction at a right angle to the axis of said pin.

4. A hinge for a box formed of slightly resilient molded material and comprising two parts, each of which is provided with a hinge-pin retaining groove opening toward the other when said parts are alined, the walls of said grooves being slightly yielding and slightly beveled inwardly from the outer ends of said grooves, and a hinge-pin seated against the inner ends of said grooves, said grooves being restricted in transverse dimension between their outer ends and said hinge-pin.

5. A hinge for a box comprising two parts of molded resilient material vertically alined when in closing position, one of said parts having spaced-apart flanges and the other a flange fitted between said spaced-apart flanges, each of said flanges having a groove extending lengthwise and opening to its outer edge, each groove having a semi-circular inner end wall forming a hinge-pin seat and having also the inner surfaces of its side walls beveled from their outer ends and converging portions extending outwardly from its pin seat to merge with said beveled portions and thus form a restricted portion within the groove slightly smaller than the diameter of the hinge-pin seat therein and slightly smaller than the entrance opening to said groove, and a hinge-pin fitted into said grooves and bearing against the several hinge-pin seats thereof.

6. A hinge for a box, comprising two parts formed of slightly yielding material, at least one of said parts having a hinge-pin retaining groove opening to its outer edge, the inner end of said groove having a hinge-pin seat, the other part having a hinge-pin parallel with said hinge-pin retaining groove and provided with an exposed part adapted to be entered in said groove when connecting said parts together, the axes of said hinge-pin and said hinge-pin seat being co-incident and the wall of said groove being provided with means to retain said hinge pin at the inner end of said groove while permitting separation of said two parts under force applied in a direction at a right-angle to the axis of said hinge pin.

7. A hinge for a box, comprising co-acting parts formed of box walls, each of said walls having at least one projecting flange at its outer edge, a hinge-pin inserted in the flange of one of said walls and having a portion projecting from the end of said last-mentioned flange to fully expose said projecting portion when said box walls are separated, the flange of the other wall having a hinge-pin retaining groove opening to its outer edge and the inner end of said groove serving as a hinge-pin seat to receive the exposed portion of said hinge-pin, the axes of said hinge-pin and said hinge-pin seat being co-incident and the walls of said hinge-pin retaining groove being provided with integral means between said hinge-pin seat and its outer end to retain said hinge-pin at the inner ends of said groove while permitting separation of said two walls under force applied in the direction at a right angle to the axis of said hinge-pin.

ALEXANDER PRIMAS.